United States Patent

Ishii et al.

[19]

[11] Patent Number: 5,852,407
[45] Date of Patent: Dec. 22, 1998

[54] MULTISTAGE INTERCONNECTION NETWORK AND PARALLEL COMPUTER USING THE SAME

[75] Inventors: Masato Ishii, Sagamihara; Patrick Hamilton, Machida, both of Japan

[73] Assignee: Hitachi, Ltd., Tokyo, Japan

[21] Appl. No.: 663,984

[22] Filed: Jun. 14, 1996

[30] Foreign Application Priority Data

Jun. 21, 1995 [JP] Japan ................................. 7-154286

[51] Int. Cl.$^6$ .................................................. H04B 3/38
[52] U.S. Cl. ............................... 340/825.8; 340/825.79; 340/826; 379/272
[58] Field of Search ......................... 340/825.8, 825.79, 340/826, 827, 825.01, 825.02; 379/271, 272

[56] References Cited

U.S. PATENT DOCUMENTS

| | | | |
|---|---|---|---|
| 4,400,627 | 8/1983 | Zola ....................................... | 340/825.8 |
| 4,811,333 | 3/1989 | Rees ....................................... | 340/825.8 |
| 4,833,468 | 5/1989 | Larson et al. ......................... | 340/825.8 |
| 4,845,736 | 7/1989 | Posner et al. ......................... | 379/272 |
| 4,952,930 | 8/1990 | Franaszek et al. .................... | 340/825.8 |
| 5,123,011 | 6/1992 | Hein et al. ............................ | 340/825.8 |
| 5,175,539 | 12/1992 | Richter .................................. | 340/825.8 |
| 5,287,491 | 2/1994 | Hsu ........................................ | 340/827 |
| 5,325,089 | 6/1994 | Goeldner ................................ | 340/826 |
| 5,390,178 | 2/1995 | Hunter .................................... | 340/826 |
| 5,396,231 | 3/1995 | Hein ....................................... | 340/825.79 |
| 5,408,231 | 4/1995 | Bowdon ................................. | 379/272 |
| 5,450,074 | 9/1995 | Yoshifuji ................................ | 340/827 |
| 5,542,048 | 7/1996 | Olnowich et al. ..................... | 340/825.8 |

FOREIGN PATENT DOCUMENTS 63-124162  5/1988  Japan .

OTHER PUBLICATIONS

*IEEE Transactions on Computers,* "Reliable Butterfly Distributed–Memory Multiprocessors", N. Tzeng, vol. 43, (1994) Sep., No. 9, New York, U.S.

*Microprocessing and Microprogramming,* "Hardware Features of the Static Communication Network of a Parallel Architecture", V. Neri, et al., vol. 38, No. 1/5, Amsterdam, Netherlands.

*Journal of Parallel and Distributed Computer,* "A Study of Permutation Networks: New Designs and Some Generalizations", A.Y. Oruc, vol. 22, No. 2, Aug. 1994, Orlando, Florida.

Primary Examiner—Brian Zimmerman
Assistant Examiner—Edward Merz
Attorney, Agent, or Firm—Antonelli, Terry, Stout & Kraus, LLP

[57] ABSTRACT

A multistage interconnection network capable of performing highly reliable communications with less hardware. In the multistage interconnection network for interconnecting a plurality of nodes, the first and final stages each have switches two times as large as the number of switches at an intermediate stage. Two output ports of each node are connected to the input ports of different first stage switches, and two input ports are connected to the output ports of final stage different switches. The input ports of switches of the intermediate stage are connected to the output ports of first stage different switches, and the output ports are connected to the input ports of final stage different switches. At least one output port of each switch at the first stage is directly connected to at least one input port of an optional switch at the final stage.

20 Claims, 3 Drawing Sheets

MULTISTAGE INTERCONNECTION NETWORK AND PARALLEL COMPUTER USING THE SAME

BACKGROUND OF THE INVENTION

This invention relates to a multistage interconnection network. More particularly, the invention relates to a multistage interconnection network for a parallel computer capable of interconnecting processor nodes with high reliability.

In the structure of a conventional parallel computer, nodes are interconnected by a multistage interconnection network (mutual interconnection network). Such a mutual interconnection network is described in JP-A-63-124162.

With the mutual interconnection network described in the above Publication, however, deadlock may occur in some communication route if the mutual interconnection network has a failure, and a bypass route avoiding this failure site cannot be established.

In order to ensure high reliability, mutual interconnection networks, for example, two networks, are provided and input-output ports of each node are duplicated. Input-output ports of one side are connected to one mutual interconnection network, and input-output ports of the other side are connected to the other mutual interconnection network. If any failure occurs on one mutual interconnection network, the other mutual interconnection network is used so as to avoid shutdown of communications to be caused by deadlock.

With such a conventional technique using two mutual interconnection networks, an amount of hardware is doubled in order to ensure high reliability. Therefore, this technique is not suitable for low cost computers.

Furthermore, since the scale of mutual interconnection network is proportional to the number of nodes of a parallel computer, an important issue of suppressing the amount of hardware of duplicated mutual interconnection networks may occur in anticipation of an increase in the number of nodes in the near future.

SUMMARY OF THE INVENTION.

It is therefore an object of the present invention to provide a multistage interconnection network for interconnecting nodes and a parallel computer using the same, capable of ensuring high reliability with a relatively less hardware amount and ensuring a communication performance equivalent to a conventional parallel computer.

In order to achieve the above object, in a multistage interconnection network for interconnecting a plurality of nodes each having two input ports and two output ports, the multistage interconnection network having a plurality of stages each having a plurality of switches is configured in the following manner.

The plurality of stages include a first stage each switch of which has an input port connected to the output port of the node, a final stage each switch of which has an output port connected to the input port of the node, and at least one intermediate stage for interconnecting the first and final stages. The first and final stages have switches two times as large as the number of switches at the intermediate stage. Two output ports of each node are connected to the input ports of different first stage switches, and two input ports are connected to the output ports of final stage different switches. The input ports of switches of the intermediate stage are connected to the output ports of first stage different switches, and the output ports are connected to the input ports of final stage different switches.

At least one output port of each switch at the first stage is directly connected to at least one input port of an optional switch at the final stage.

With the above structure, in a multistage interconnection network for interconnecting a plurality of nodes, the two output ports of each node can be assigned first stage different switches, and the two input ports of each node can be assigned final stage different switches.

At least one output port of each switch at the first stage has a route to at least one input port of a switch at the final stage. In other words, a plurality of routes are provided from the first stage to the final stage. In transferring a packet from the transfer originating node to the transfer destined node, the route from the output port of the transfer originating node to a switch at the first stage of the network becomes duplicate, a plurality of routes are provided from a crossbar switch at the first stage to a crossbar switch at the final stage, and the route from the crossbar switch at the final stage of the network to an input port of the transfer destined node becomes duplicate. Therefore, high reliability of the network can be achieved.

The plurality of routes between the first stage switch to the final stage switch are not necessarily required to be formed by two networks of the same structure.

DETAILED DESCRIPTION OF THE PREFERRED EMBODIMENTS

Figure 1:
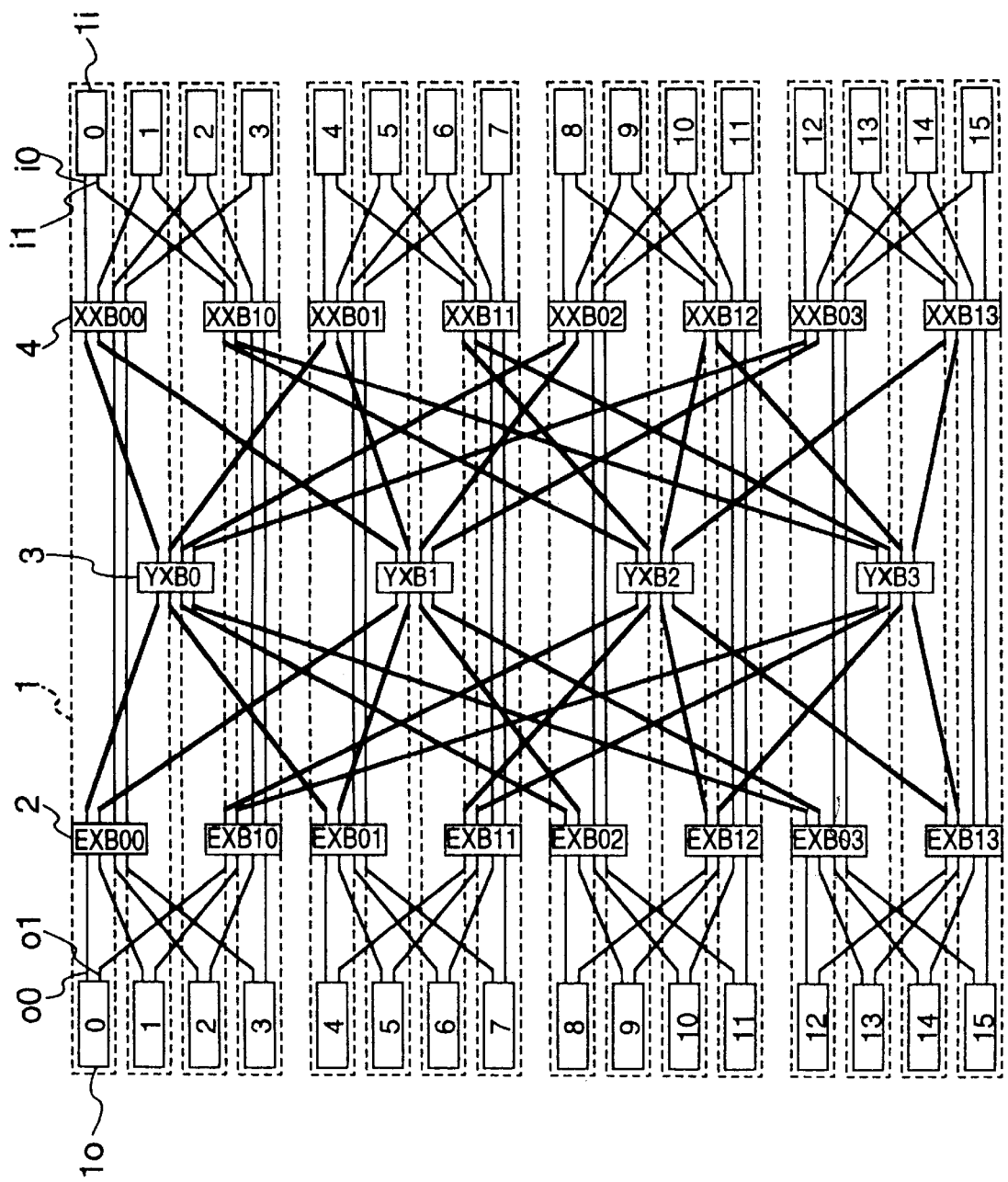
FIG. 1 is a diagram showing the structure of a multistage interconnection network of this invention.

Embodiments of the invention will be described with reference to the accompanying drawings.

A parallel computer of this invention is constituted by a plurality of nodes (processor nodes) and a multistage interconnection network for interconnection of nodes. The multistage interconnection network is an interconnection network which is structured by a combination of a plurality of stages (multistage) of crossbar switches. Each crossbar switch has M input ports and M output ports, wherein M is a positive integer. The total number of input/output ports of a parallel computer is expressed by:

$$N = 2^{**}n \text{ (n is a positive integer)} \qquad (1)$$

where 2n indicates 2 raised to a power n (in this specification,  represents a power).

The number M of ports of a crossbar switch is expressed by:

$$M = 2^{**}m \text{ (m is a positive integer)} \qquad (2)$$

Each crossbar switch has M input -ports, M output ports, and M switches and can interconnect optional unused input-output ports without any wait time.

Representing the number of stages of a multistage interconnection network by k, this network can interconnect nodes as many as given by the following formula:

$$M^{**}k \qquad (3)$$

Consider now that N nodes are interconnected by k stages of crossbar switches. In this case, it is necessary that the number of nodes interconnected by k stages of crossbar switches is equal to, or larger than, the total node number of a parallel computer. Therefore, the following formula must be satisfied:

$$N \leq M^{**}k \quad (4)$$

Substituting the formulae (1) and (2) into the formula (4), then it stands:

$$2^{}n \leq 2^{} \text{ (mk)} \quad (5)$$

Therefore, $$n \leq mk \quad (6)$$

and also $$k \geq n/m \quad (7)$$

Therefore, if N nodes are to be interconnected by a combination of a plurality of stages of crossbar switches each having M input-output ports, the necessary number of stages is at least a minimum integer of n/m. In this specification, it is assumed that a formula <n/m> represents a minimum integer equal to or larger than n/m.

Assuming that the total node number N is 16 and the input-output port number M of each crossbar switch is 4, then N=16=2n=24 and M=4 =2m=22. Therefore, <n/m>=<4/2>=2 and the number of stages of crossbar switches is at least two.

In the embodiment of this invention, a parallel computer having 2**4 (=16) nodes will be described.

FIG. 1 shows a parallel computer using a multistage interconnection network which is constituted by 2**4 (=16) nodes indicated by reference numeral 1 and <4/2>+1 (=3) stages (E, X, and Y stages) of crossbar switches (each having M input-output ports) for interconnecting the nodes. In FIG. 1, a portion encircled by a broken line indicates one node. For the convenience of description, sixteen nodes are assigned reference numerals 0 to 15 and discriminated by representing them as node No. 0 to node No. 15. Each node has a node address of four bits in binary notation (four bits corresponding to the node number sixteen).

The reason of an addition of 1 to <4/2> is to increase the number of stages of the multistage interconnection network so that redundancy and route number of the network can be increased. Therefore, the number of alternate routes selectable during a failure can be increased.

In the following embodiment, although the number of stages is increased only by one, it may be increased more depending upon the degree of redundancy. Each node corresponds to a portion encircled by a broken line in FIG. 1 as previously described, and for the purpose of designation in FIG. 1, an output side o (out) and an input side i (input) are discriminately shown.

Figure 2:
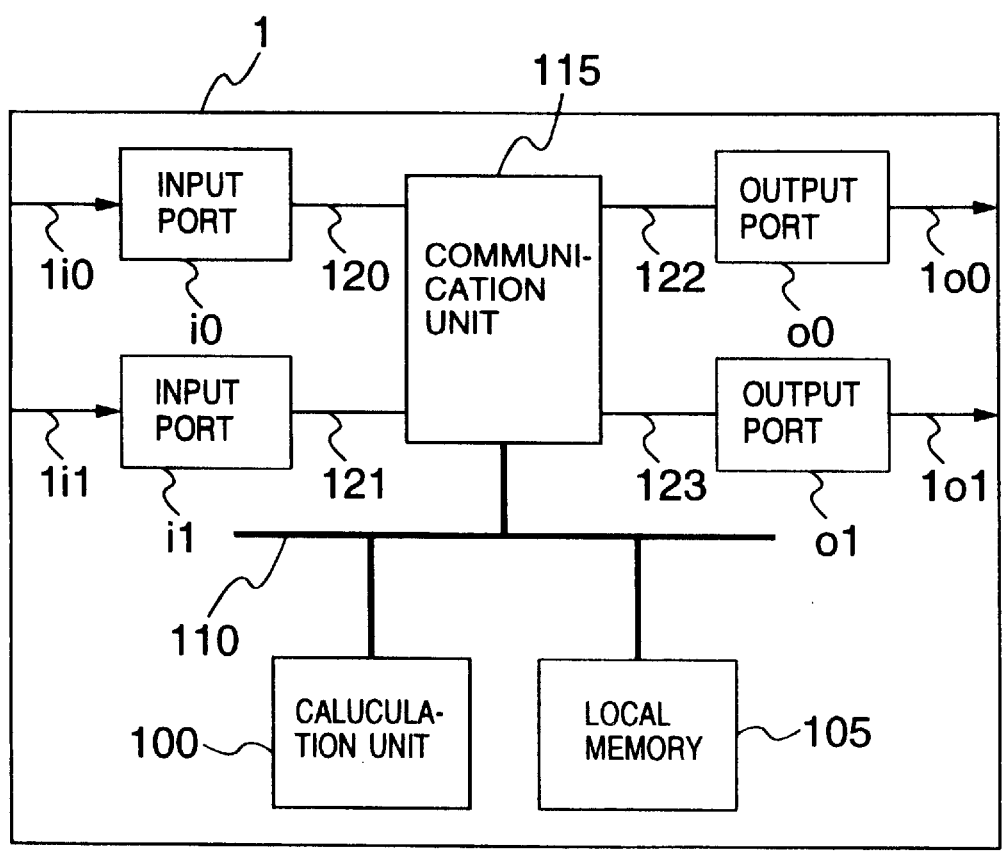
FIG. 2 is a diagram showing the structure of a node.

FIG. 2 is a detailed diagram showing the internal structure of each node of this embodiment corresponding to the portion encircled by the broken line in FIG. 1.

The node 1 has two input ports i0 and i1 for receiving signals from the multistage interconnection network, which ports are connected to corresponding input signal lines 1i0 and 1i1. The node 1 has also two output ports o0 and o1 for transmitting signals to the multistage interconnection network, which ports are connected to corresponding output signal lines 1o0 and 1o1. The node 1 also has a calculation unit 100 for performing a calculation of the parallel computer, a local memory (used as a general storage) 105, a communication unit 115 for signal transfer to and from crossbar switches via signal lines, and a bus 110. The communication unit, calculation unit, and local memory are interconnected by the bus 110 via which data or the like are transferred. The node 1 also has signal lines 120 and 121 for transmitting a signal from the input ports i0 and i1 to the communication unit 115 and signal lines 122 and 123 for transmitting signals from the communication unit 115 to the output ports o0 and o1.

Figure 3:
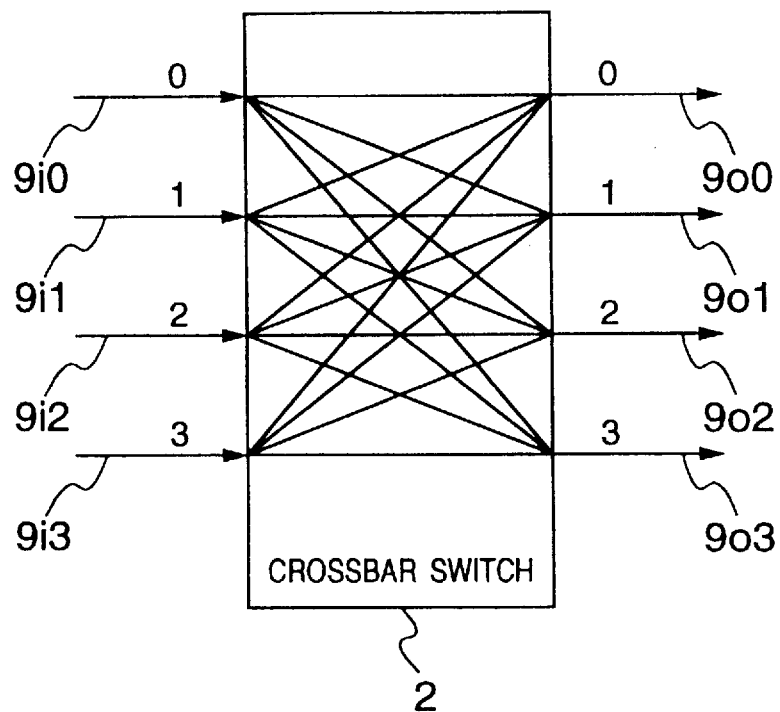
FIG. 3 is a diagram showing the structure of a crossbar switch.

FIG. 3 shows a crossbar switch of this embodiment. The crossbar switch has 22 (=4) input ports and 22 (=4) output ports. Respective input ports of each crossbar switch are assigned input port numbers 0, 1, 2, and 3 (00, 01, 10, and 11 in binary notation) and connected to input signal lines 9i0, 9i1, 9i2, and 9i3. Respective output ports are assigned output port numbers 0, 1, 2, and 3 (00, 01, 10, and 11 in binary notation) and connected to output signal lines 9o0, 9o1, 9o2, and 9o3.

In the following, the parallel computer with a multistage interconnection network constituted by 2**4 (=16) nodes and <4/2>+1 (=3) stages shown in FIG. 1 will be described.

The node transmits and receives data to and from the multistage interconnection network, the input port side is represented by 1i and the output port side is represented by 1o.

The column represented by reference numeral 2 in FIG. 1 is the first stage of the multistage interconnection network, i.e., the crossbar stage to which a signal transmitted from the node is first input. The number of crossbar switches at the first stage is determined in the following manner. Since the node number is N (=2n) and the port number of one crossbar switch is M (=2m), the number of minimum necessary crossbar switches is <N/M> which is a minimum integer equal to or larger than N/M. In this embodiment, however, in order to give redundancy to signal lines between the nodes and crossbar switches of the first stage, 2×(N/M) crossbar switches are provided at the first stage.

The two output ports of each node are connected to different crossbar switches so that each node has essentially two output routes. Since the node number is N=2n=16 and the input port number of a crossbar switch is M=2m=4 in the example shown in FIG. 1, the number of crossbar switches necessary for the first stage is 2×<(2n)/(2m)>=2 (n−m+1)=2 (4−2+1)=8. In the example shown in FIG. 1, these crossbar switches are represented by EXB00, EXB10, EXB01, EXB11, EXB02, EXB12, EXB03, and EXB13, starting from the uppermost switch.

The column represented by reference numeral 3 in FIG. 1 is the second stage of the multistage interconnection network, i.e., the stage (intermediate stage) of crossbar switches which are not directly connected to each node. This intermediate stage is constituted by <N/M>=(2n)/(2m) =2** (4−2) =4 crossbar switches. In the example shown in FIG. 1, these crossbar switches are represented by YXB0, YXB1, YXB2, and YXB3. A redundancy structure is not incorporated to the crossbar switches at the intermediate stage not directly relevant to each node.

The column represented by reference numeral 4 in FIG. 1 is the third stage of the multistage interconnection network, i.e., the stage (final stage before a node) the crossbar switch of which outputs a signal to each node. Each crossbar switch at the final stage is connected to the input ports of each node. Since the node number is N (=2n) and the port number of one crossbar switch is M (=2m), the number of minimum necessary crossbar switches at the final stage is <N/M>. In this embodiment, however, in order to give redundancy to signal lines between the nodes and crossbar switches at the final stage, 2×(N/M) crossbar switches are provided at this final stage. The two input ports of each node are connected to different crossbar switches at the final stage so that each node has essentially two input routes via which signals are received. The column 4 is constituted by 2** (4−2 +1)=8 crossbar switches, and these crossbar switches are represented by XXB00, XXB10, XXB01, XXB11, XXB02, XXB12, XXB03, and XXB13, starting from the uppermost crossbar switch.

The output signal line 1o0 connected to the output port o0 of each node of node No. 0 to node No. 3 shown in FIG. 1 is connected to a corresponding input port of the crossbar switch EXB00 of the first stage, in one-to-one correspondence. Namely, the input signal lines 9i0, 9i1, 9i2, and 9i3 of the crossbar switch EXB00 shown in FIG. 3 are the same as the output signal lines 1o0 of respective node No. 0 to No. 3.

The output signal line lo connected to the output port ol of each node of node No. 0 to node No. 3 shown in FIG. 1 is connected to a corresponding input port of the crossbar switch EXB10 of the first stage, in one-to-one correspondence. Namely, the input signal lines 9i0, 9i1, 9i2, and 9i3 of the crossbar switch EXB10 shown in FIG. 3 are the same as the output signal lines 1o1 of respective node No. 0 to No. 3.

Similar to each output port of node No. 0 to node No. 3, each output port of node No. 4 to node No. 7, node No. 8 to node No. 11, and node No. 12 to node No. 15 is connected to a corresponding one of the crossbar switches at the first stage EXB01, EXB11, EXB02, EXB12, EXB03, and EXB13.

With the above structure, two output ports of each node are connected to different crossbar switches. Accordingly, one of the two output ports of each node is connected to one of the crossbar switches at the first stage EXB00, EXB01, EXB02, and EXB03, whereas the other output port is connected to one of the crossbar switches at the first stage EXB10, EXB11, EXB12, and EXB13. With this structure, therefore, each node has essentially two routes via which a signal is transmitted to the multistage interconnection network, and the crossbar switches of the first stage connected to the two routes are different for each route. Accordingly, even if a failure occurs in the crossbar switch of the first stage, the node connected to this failed crossbar switch can transmit a signal via the other crossbar switch.

Next, of the crossbar switches of the first stage, each output signal line 9o0 of the crossbar switches EXB00, EXB01, EXB02, and EXB03 is connected to a corresponding one of input ports of the crossbar switch YXB0 of the intermediate stage in one-to-one correspondence. Namely, the input signal lines 9i0, 9i1, 9i2, and 9i3 of the crossbar switch YXB0 are the same as the output signal lines 9o0 of the respective crossbar switches EXB00, EXB01, EXB02, and EXB03.

Each output signal line 9o1 of the crossbar switches EXB00, EXB01, EXB02, and EXB03 ,is connected to a corresponding one of input ports of the crossbar switch YXB1 of the intermediate stage in one-to-one correspondence. Namely, the input signal lines 9i0, 9i1, 9i2, and 9i3 of the crossbar switch YXB1 are the same as the output signal lines 9o0 of the respective crossbar switches EXB00, EXB01, EXB02, and EXB03.

Similarly, of the crossbar switches of the first stage, each output signal line 9o0 of the crossbar switches EXB10, EXB11, EXB12, and EXB13 is connected to a corresponding one of input ports of the crossbar switch YXB2 in one-to-one correspondence, and each output signal line 9o1 of the crossbar switches EXB10, EXB11, EXB12, and EXB13 is connected to a corresponding one of input ports of the crossbar switch YXB3 in one-to-one correspondence.

Next, of the crossbar switches of the intermediate stage, each output signal line 9o0 of the crossbar switches YXB0 and YXB1 is connected to a corresponding one of the input ports of the crossbar switch XXB00 of the final stage in one-to-one correspondence. Namely, the input signal lines 9i0 and 9i1 of the crossbar switch XXB00 are the same as the output signal lines 9o0 of the respective crossbar switches YXB0 and YXB1.

Similarly, each output signal line 9o1 of the crossbar switches YXB0 and YXB1, each output signal line 9o2 of the crossbar switches YXB0 and YXB1, and each output signal lines 9o3 of the crossbar switches YXB0 and YXB1, are connected to corresponding ones of the input ports of the respective crossbar switches XXB01, XXB02, and XXB03 of the final stage in one-to-one correspondence.

Of the crossbar switches of the intermediate stage, each output signal line 9o0 of the crossbar switches YXB2 and YXB2 is connected to a corresponding one of the input ports of the crossbar switch XXB10 of the final stage in one-to-one correspondence. Namely, the input signal lines 9i0 and 9i1 of the crossbar switch XXB10 are the same as the output signal lines 9o0 of the respective crossbar switches YXB2 and YXB3.

Similarly, each output signal line 9o1 of the crossbar switches YXB2 and YXB3, each output signal line 9o2 of the crossbar switches YXB2 and YXB3, and each output signal lines 9o3 of the crossbar switches YXB2 and YXB3, are connected to corresponding ones of the input ports of the respective crossbar switches XXB11, XXB12, and XXB13 of the final stage in one-to one correspondence.

Next, the output signal lines 9o2 and 9o3 of the crossbar switch XXB00 of the first stage are connected to the corresponding ones of the input ports of the crossbar switch XXB00 of the final stage in one to-one correspondence. Namely, the input signal lines 9i2 and 9i3 of the crossbar switch XXB00 are the same as the output signal lines 9o2 and 9o3 of the crossbar switch EXB00, respectively.

Similarly, the output signal lines 9o2 and 9o3 of the crossbar switches EXB10, EXB01, EXB11, EXB02, EXB12, EXB03, and EXB13 are connected to the corresponding ones of the input ports of the crossbar switches XXB10, XXB01, XXB11, XXB02, XXB12, XXB03, and XXB13, respectively in one-to-one correspondence.

Next, the output signal lines 9o0, 9o1, 9o2, and 9o3 of the crossbar switch XXB00 of the final stage are connected to the corresponding input ports i0 of the respective nodes No. 0 to node No. 3. Specifically, the input signal lines 1o0 of the respective nodes No. 0 to No. 3are the same as the output signal lines 9o0, 9o1, 9o2, and 9o3 of the crossbar switch XXB00.

The output signal lines 9o0, 9o1, 9o2, and 9o3 of the crossbar switch XXB10 are connected to the corresponding input ports i1 of the respective nodes No. 0 to node No. 3. Specifically, the input signal lines 1i1 of the respective nodes No. 0 to No. 3 are the same as the output signal lines 9o0, 9o1, 9o2, and 9o3 of the crossbar switch XXB10.

Similarly, the crossbar switches XXB01, XXB11, XXB02, XXB12, XXB03, and XXB13 are also connected to the corresponding ones of the input ports of the nodes No. 4 to No. 7, nodes No. 8 to No. 11, and nodes No. 12 to No. 15. Therefore, each node has essentially two routes via which a signal is received from the multistage interconnection network, and the crossbar switches of the final stage connected to the two reception routes are different for each reception route. Accordingly, even if a failure occurs in the crossbar switch of the final stage, the node connected to this failed crossbar switch can receive a signal via the other crossbar switch.

With the structure of the multistage interconnection network constructed as above, each node has essentially two transmission routes and two reception routes at its input and output ports. In this multistage interconnection network having two routes, a signal is transferred via a physically different crossbar switch. Accordingly, even if a failure occurs in one crossbar switch, the other crossbar switch can establish a communication route.

Furthermore, even between the first stage crossbar switch and final stage crossbar switch, two or more routes are always provided and a signal passes through different crossbar switches in each route. Accordingly, in transferring a signal from a transfer originating node to a transfer destined node, bypass routes are retained always and by all means.

Next, a routing method for the multistage interconnection network and nodes according to an embodiment of this invention will be described.

Figure 4:
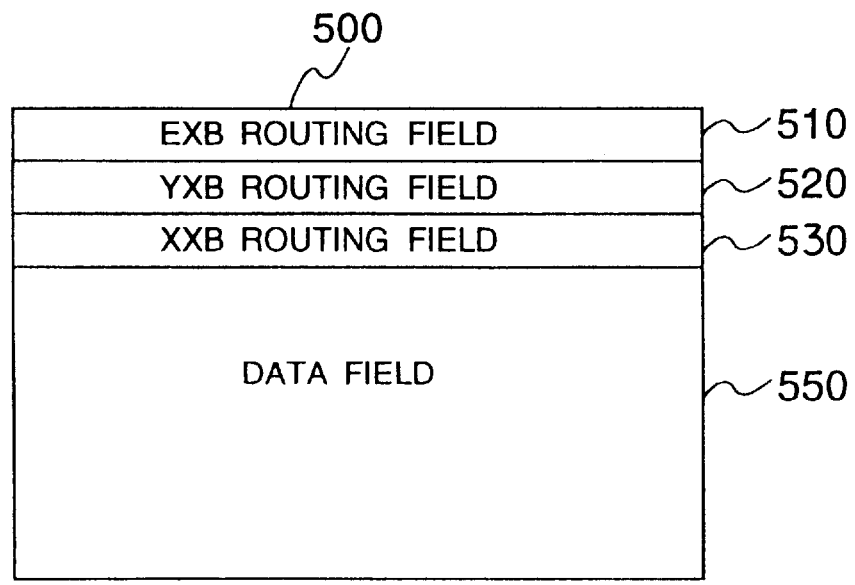
FIG. 4 is a diagram showing the structure of a communication packet.

FIG. 4 shows the structure of a communication packet used for inter-node communications of this embodiment.

The communication packet 500 is constituted by routing fields 510, 520, and 530 formed at the header portion thereof for storing routing data, and a data field 550 for storing data to be transferred.

An EXB routing field 510 indicates an output port to be selected by a crossbar switch EXB (of the first stage). A YXB routing field 520 indicates an output port to be selected by a crossbar switch YXB (of the intermediate stage). An XXB routing field 530 indicates an output port to be selected by a crossbar switch XXB (of the final stage).

The EXB routing field 510 is constituted by two bits which are set by a transfer originating node. The higher bit indicates information representative of an interconnection relation between the transfer originating node and a transfer destined node. If the transfer destined node is a node connected to a first stage crossbar switch to which the originating node is connected, this transfer originating node sets "1" to the higher bit to indicate such a relation. If the transfer destined node is a node connected to a first stage crossbar switch different from the first stage crossbar switch to which the originating node is connected, this transfer originating node sets "0" to the higher bit to indicate such a relation.

If "1" is set, the first stage crossbar switch EXB performs a direct routing of a packet supplied from the node, by using a signal line directly connected to the final stage crossbar switch XXB, without using an intermediate stage crossbar switch. If "0" is set, the first stage crossbar switch EXB transfers (routes) a packet supplied from the node to an intermediate stage crossbar switch.

It is assumed that each node stores in the local memory 105 the interconnection relation of the multistage interconnection network between the transfer destined node and its own node.

The lower bit of the EXB routing field is set with "1" or "0". This bit is used, if there are a plurality of routes selectable by "0" or "1" of the higher bit, for determining which route among the plurality of routes is selected. For example, if the higher bit is "0" and an intermediate stage crossbar switch is used, the crossbar switch EXB00 selects the crossbar switch YXB0 if the lower bit is "0" and the crossbar switch YXB1 if the lower bit is "1".

This value of the lower bit is determined by each node in accordance with a packet transfer originating node number, a packet transfer destined node number, a random number, or a communication load balance of the interconnection network, or a combination of these, for example, in order for the plurality of routes to be used uniformly.

One of the values "0" and "1" may be set in a normal state, and the other value may be set to bypass the normally set route when a communication line abnormal state, a crossbar switch failure, or the like occurs in the normally set route.

The YXB routing field 520 is set with a value indicating an output port number of an intermediate stage crossbar switch YXB which refers to this value and determines the output port. This value is set by a transfer originating node. For example, the upper two bits of the binary four bits of the transfer destined node number are set, or a value of the upper two bits of the node number decoded into proper information easy to be understood by the crossbar switch YXB is set.

The XXB routing field 530 is set with a value indicating the output port number of a final stage crossbar switch XXB which refers to this value and determines an output port. This value is set by a transfer originating node. For example, the lower two bits of the binary four bits of the transfer destined node number is set, or a value of the lower two bits of the node number decoded into proper information easy to be understood by the crossbar switch XXB is set.

Each port performs routing in the following manner, for determining a packet transmission route.

Each node selects one of the two output ports to use it as an active port, in accordance with a packet transfer originating node number, a packet transfer destined node number, a random number, or a communication load balance of the interconnection network, or a combination of these.

Next, a communication method in a normal state of the multistage interconnection network will be described.

(A) Point-to-point communication between optional nodes under a normal state of the multistage interconnection network.

(1) Transfer of a packet from node No. 3 to node No. 7.

First, since the transfer destined node (node No. 7) is connected to the first stage crossbar switches (EXB01 and EXB11) different from the first stage crossbar switches (EXB00 and EXB10) connected to the transfer originating node (node No. 3), the calculation unit 100 of node No. 3 sets "0" to the higher bit of the two bits of the EXB routing field 510, via the bus 110, and sets "0" determined, for example, from a random number, to the lower bit of the EXB routing field 510.

The calculation unit 100 of node No. 3 further sets a decoded value "0100" of the upper two bits of the binary node number "0111" of the transfer destined node (node No. 7), to the YXB routing field 520. It is assumed here that the position of bit "1"of the decoded value "0100" as viewed from the highest bit thereof corresponds to the output port number of crossbar switch YXB. Therefore, the value "0100" in the YXB routing field corresponds to the output port number 1 of the crossbar switch YXB.

The calculation unit 100 of node No. 3 further sets a decoded value "0001" of the lower two bits of the binary node number "0111" of the transfer destined node (node No. 7), to the XXB routing field 530. Therefore, the value "0001" in the XXB routing field corresponds to the output port number 3 of the crossbar switch XXB.

The data to be transferred is then stored in the data field and the packet 500 such as shown in FIG. 4 is stored in the local memory 105.

Next, the calculation unit 100 of node No. 3 selects an output port to be used for transmission of the packet 500, in accordance with a generated random number. It is assumed here that the output port o0 is used. The calculation unit 100 notifies via the bus 110 the communication unit 115 of the output port o0 to be used, and instructs the communication unit 115 to transfer the packet 500. Upon transfer instruction of the packet 500 from the calculation unit 100, the communication unit 115 reads via the bus 110 the transfer packet 500 from the local memory 105, and transfers the read packet 500 from the output port o0 to the output signal line 1o0 and to the crossbar switch EXB00.

Upon reception of the packet 500 from node No. 3 , the crossbar switch EXB00 checks the value "00" in the EXB routing field 510 of the packet 500 to select the output port 0 and transfer the packet 500 via the output signal line 9o0 of the output port 0 to the crossbar switch YXB0 connected to the output signal line 9o0.

Upon reception of the transfer packet 500 from EXB00, the crossbar switch YXB0 checks the value "0100" in the YXB routing field 520 of the packet 500 to select the output port 1 and transfer the packet 500 via the output signal line 9o1 of the output port 1 to the crossbar switch XXB0 connected to the output signal line 9o1.

Upon reception of the transfer packet 500 from YXB0, the crossbar switch XXB01 checks the value "0001" in the XXB routing field 530 of the packet 500 to select the output port 3 and transfer the packet 500 via the output signal line 9o3 of the output port 3 to the node No. 7 connected to the output signal line 9o3.

In the above manner, packet transfer from node No. 3 to node No. 7 is completed.

(2) Transfer of a packet from node No. 3 to node No. 1.

First, since the transfer destined node (node No. 1) is connected to the first stage crossbar switches (EXB00 and EXB10) connected to the transfer originating node (node No. 3 ), the calculation unit 100 of node No. 1 sets "1" to the higher bit of the two bits of the EXB routing field 510, via the bus 110, and sets "0" determined, for example, from a random number, to the lower bit of the EXB routing field 510.

The calculation unit 100 of node No. 3 further sets a decoded value "1000" of the upper two bits of the binary node number "0001" of the transfer destined node (node No. 1), to the YXB routing field 520.

The calculation unit 100 of node No. 3 further sets a decoded value "0100" of the lower two bits of the binary node number "0001" of the transfer destined node (node No. 1), to the XXB routing field 530. The data to be transferred is then stored in the data field and the packet 500 such as shown in FIG. 4 is stored in the local memory 105.

Next, the calculation unit 100 of node No. 3 selects the output port ol to be used for transmission of the packet 500, in accordance with a generated random number. The calculation unit 100 notifies via the bus 110 the communication unit 115 of the output port ol to be used, and instructs the communication unit 115 to transfer the packet 500. Upon transfer instruction of the packet 500 from the calculation unit 100, the communication unit 115 reads via the bus 110 the transfer packet 500 from the local memory 105, and transfers the read packet 500 from the output port ol to the output signal line 1o1 and to the crossbar switch EXB10.

Upon reception of the packet 500 from node No. 3 , the crossbar switch EXB10 checks the value "10"in the EXB routing field 510 of the packet 500 to select the output port 2 and transfer the packet 500 via the output signal line 9o2 of the output port 2 to the crossbar switch XXB10 connected to the output signal line 9o2.

Upon reception of the transfer packet 500 from EXB10, the crossbar switch XXB10 checks the value "0100" in the XXB routing field 530 of the packet 500 to select the output port 1 and transfer the packet 500 via the output signal line 9o1 of the output port 1 to node No. 1 connected to the output signal line 9o1.

In the above manner, packet transfer from node No. 3 to node No. 1 is completed.

(B) Broadcast communication from an optional node to all nodes under a normal state of the multistage interconnection network.

Broadcast communication from node No. 3 to all nodes will be described illustratively.

First, since the transfer destined nodes include nodes connected to the first stage crossbar switches different from the first stage crossbar switches connected to the transfer originating node (node No. 3 ) (because of broadcast communication, there are nodes connected to other crossbar switches), the calculation unit 100 of broadcasting node No. 3 sets "0" to the higher bit of the two bits of the EXB routing field 510, via the bus 110, and sets a value (for example "0" determined from a random number) for designating the output port of the crossbar switch YXB, to the lower bit of the EXB routing field 510. All bits of the YXB routing field 520 are set with "1", and all bits of the XXB routing field 530 are set with "1". In this manner, the crossbar switches YXB and XXB copy the received packets and transmit them to all routes. The data to be transferred is then stored in the data field and the packet 500 such as shown in FIG. 4 is stored in the local memory 105.

Next, the calculation unit 100 of node No. 3 selects the output port o0 to be used for transmission, in accordance with a generated random number. The calculation unit 100 notifies via the bus 110 the communication unit 115 of the output port o0 to be used, and instructs the communication unit 115 to transfer the packet 500. Upon transfer instruction of the packet 500 from the calculation unit 100, the communication unit 115 reads via the bus 110 the transfer packet 500 from the local memory 105, and transfers the read packet 500 from the designated output port o0 to the output signal line 1o0 and to the crossbar switch EXB00.

Next, upon reception of the packet 500 from node No. 3, the crossbar switch EXB00 checks the value "00" in the EXB routing field 510 of the packet 500 to select the output port 0 and transfer the packet 500 via the output signal line 9o0 of the output port 0 to the crossbar switch YXB0 connected to the output signal line 9o0.

Upon reception of the transfer packet 500 from EXB00, the crossbar switch YXB0 checks the value "1111" in the YXB routing field 520 of the packet 500 to copy the packet 500 and transfer the copied packets 500 via the output signal lines 9o0, 9o1, 9o2, and 9o3 of all the output ports 0, 1, 2, and 3 to the crossbar switches XXB0, XXB1, XXB2, and XXB3 connected to all the output signal lines.

Upon reception of the transfer packet 500 from YXB0, each of the crossbar switches XXB0, XXB1, XXB2, and XXB3 checks the value "1111" in the XXB routing field 530 of the packet 500 to copy the packet 500 and transfer the copied packets 500 via the output signal lines 9o0, 9o1, 9o2, and 9o3 of all the output ports 0, 1, 2, and 3 to nodes No. 0 to No. 3, node No. 4 to node NO. 7, node No. 8 to No. 11, and node No. 12 to node No. 15, respectively connected to each output signal line.

The description of communication methods under a normal state has been given above.

Next, communication methods to be performed when a failure occurs in the multistage interconnection network will be described using particular examples.

(C) Point-to-point communication between optional nodes in the multistage interconnection network with a failure.

(4) Transfer of a packet from node No. 3 to node No. 7.

In this case, it is assumed in the following description that a failure is, for example, in the crossbar switch EXB10.

First, the transfer originating node (node No. 3) stores a transfer packet 500 in the local memory, similar to the case (1) wherein a packet is transmitted in the multistage interconnection network under a normal state. It is necessary for the transfer originating node (node No. 3) to determine the output port for transmission of the packet 500 to the first stage crossbar switch. However, since the first stage crossbar switch EXB10 has a failure and it cannot be used, the output port connected to the crossbar switch EXB00 in a normal state is selected. The transfer originating node instructs via the bus 110 the communication unit 115 to use the output port o0, and instructs it to transfer the packet 500. Thereafter, the communication unit 115 transfers the packet 500 in the manner similar to the case (1).

The crossbar switches EXB00, YXB0, and XXB01 execute a transfer process of the packet 500 in the manner similar to the case (1).

Specifically, if both the first crossbar switches EXB00 and EXB01 of the multistage interconnection network are normal, the transfer originating node (node No. 3) determines to which crossbar switch the packet is to be transmitted, in accordance with a generated random number or the like. However, if there is a failure in a destined crossbar switch, an output port connected to a normal crossbar switch is selected. It is assumed that each node detects at proper timings a failure or the like of a crossbar switch, for example, by a periodical exchange of a message (indicating a state of a crossbar switch) with a crossbar switch, by an interception of the message exchange, by a notice from a failure notice line between a node and a crossbar switch, or by a notice from a network managing apparatus which manages the whole of the multistage interconnection network.

(5) Transfer of a packet from node No. 3 to node No. 7.

In this case, it is assumed in the following description that a failure is, for example, in the crossbar switch YXB0.

For packet transmission, the calculation unit 100 of node No. 3 generates the routing fields. In this case, a value for designating a second stage crossbar switch is required to be set to the lower bit of the two-bit EXB routing field 510. However, there is a failure in the crossbar switch YXB0 and it cannot be used. Therefore, the calculation unit 100 of node No. 3 sets "1" to the lower bit to designate the output port connected to the crossbar switch YXB1. Setting the other packet fields is the same as the case (1). Therefore, the value of the EXB routing field 510 becomes "01". Transfer of the packet 500 from the node to the first stage crossbar switch is also the same as the case (1). The generated packet 500 is transferred from the designated output port o0 to the crossbar switch EXB00 via the output signal line 1o0.

Upon transfer of the packet 500 from node No. 3, the crossbar switch EXB00 determines to transmit the packet to the intermediate stage crossbar switch because the upper bit of the value "01" in the EXB routing field 510 is "0", selects the output port 1 of its own crossbar switch EXB00 because the lower bit of the value "01" in the EXB routing field 510 is "1", and transfers the packet 500 via the output signal line 9o1 of the output port 1 to the crossbar switch YXB1 connected to the output signal line 9o1. The processes to follow are the same as the case (1).

Specifically, if the transfer originating node (node No. 3) sets "1" for designating the output port connected to the normal crossbar switch YXB1, as the value for designating the intermediate stage crossbar switch (the lower bit in the EXB routing field 510), the multistage interconnection network does not use the failed crossbar switch, i.e., a failed route, and the packet can be transferred by all means to the transfer destined node. It is assumed that each node detects at proper timings a failure or the like of a crossbar switch, by the methods described earlier.

(6) Transfer of a packet from node No. 3 to node No. 7.

In this case, it is assumed in the following description that a failure is, for example, in both the crossbar switches EXB10 and YXB0.

For packet transmission, the calculation unit 100 of node No. 3 generates the routing fields. In this case, the calculation unit 100 of node No. 3 sets a value "1" for designating an output port connected to the normal crossbar switch YXB1, as the value for designating an intermediate stage crossbar switch (the lower bit in the EXB routing field 510), because there is a failure in the crossbar switch YXB0 and it cannot be used. Setting the other packet fields is the same as the case (1).

Next, since the crossbar switch EXB10 cannot be used, the calculation unit 100 of node No. 3 selects the output port o0, instructs via the bus 110 the communication unit 115 to use the output port o0, and instructs it to transfer the packet 500. Upon reception of transfer instruction of the packet 500 from the calculation unit 100, the communication unit 115 reeds via the bus 110 the transfer packet 500 from the local memory 105, and transfers the read packet 500 from the designated output port o0 to EXB00 via the output signal line 1o0. The succeeding operations of the crossbar switches of the multistage interconnection network are the same as the case (5) with the failed crossbar switch YXB0.

As in the cases (4), (5), and (6), if a failure occurs in a crossbar switch of the multistage interconnection network, the transfer originating node sets each routing field so as to avoid a failed site and enable inter-node communication. In the cases (4), (5), and (6), point-to-point communication has been described. Also in broadcast communication, each routing field is set so as to avoid a failed crossbar switch and enable communication similar to point-to point communication.

In this embodiment, in point-to-point communication between optional nodes, each node has two output ports, and therefore two communication routes. The first stage crossbar switch EXB has 2** (2-1) (=2) communication routes. Therefore, the total number of communication routes is 2×2=4. A communication route for point-to-point communication between optional nodes can be therefore selected from four routes. In other words, even if one communication has a failure, another communication route can be used and communication between nodes can be established without fail.

In point-to-point communication between the nodes whose output ports (or input ports) are connected to the same crossbar switch, there are 2** (2-1) (=2) communication routes directly connecting the first stage crossbar switch EXB to which the output port of the node is connected and the final stage crossbar switch XXB to which the input port of the node is connected. Therefore, the communication routes are the above-described four communication routes plus these two communication routes, totalling six communication routes. For point-to-point communication between the nodes whose output ports (or input ports) are connected to the same crossbar switch, a communication route can be selected from these six communication routes.

The structure of the multistage interconnection network of this invention can be generalized as in the following.

By representing the number of nodes having input-output ports by N and the number of input-output ports of a crossbar switch by M, the minimum number of crossbar switches required at each stage of the multistage interconnection network is a minimum integer equal to or larger than the node number divided by the number of input-output ports of a crossbar switch, i.e., <N/M>.

If the node number is N=2n (n: positive integer) and the number of input-output ports of a crossbar switch is M=2m (m: positive integer), the number of crossbar switches required at each stage is N/M=(2n)/(2M)=2**(n−m).

As described earlier, the minimum number of stages required in the multistage interconnection network is <n/m>.

In addition, in this invention, in order to improve the reliability of communication routes from a transfer originating node to a transfer destined route, each node is provided with two input ports and two output ports, and the number of stages of crossbar switches is increased by one, i.e., <n/m>+1. Furthermore, the numbers of crossbar switches at the first stage and the final stage [(<n/m>+1)-th stage] before a node are doubled to 2×<N/M>.

Ones of two output ports of respective nodes are connected in one-to-one correspondence to the input ports of <N/M> first stage crossbar switches which are a half of 2×<N/M> first stage crossbar switches of the multistage interconnection network. The others of two output ports of respective nodes are connected in one-to-one correspondence to the input ports of <N/M> first stage crossbar switches which are the remaining half of 2×<N/M> first stage crossbar switches of the multistage interconnection network.

Ones of two input ports of respective nodes are connected in one-to-one correspondence to the output ports of <N/M> final stage crossbar switches which are a half of 2×<N/M> final stage crossbar switches of the multistage interconnection network. The others of two input ports of respective nodes are connected in one-to-one correspondence, to the output ports of <N/M> final stage crossbar switches which are the remaining half of 2×<N/M> final stage crossbar switches of the multistage interconnection network.

Further, 2** (m−1) output ports, which are a half of the output ports of crossbar switches at the first stage of the multistage interconnection network, are connected in one-to-one correspondence to input ports of different crossbar switches at the second stage. The output ports of crossbar switches at the <n/m>-th stage of the multistage interconnection network are connected in one-to-one correspondence to input ports of difference crossbar switches at the final stage. From the output ports of crossbar switches at the second stage of the multistage interconnection network to the input ports of crossbar switches at the <n/m>-th stage, respective output ports of crossbar switches at each stage are connected in one-to-one correspondence to ones of input ports of different crossbar switches at the next stage.

Still further, 2 (m−1) output ports, which are the remaining half of the output ports of crossbar switches at the first stage connected to the output ports of respective nodes, are directly connected in one-to-one correspondence to 2 (m−1) input ports which are the remaining half of crossbar switches at the final stage connected to the input ports of respective nodes.

The structure of the multistage interconnection network may be confined from the second stage to the <n/m>-th stage, as in the following.

From the second stage to the <n/m>-th stage, crossbar switches are divided into two groups (E and F groups) each having 2 (n−m−1) crossbar switches, and the divided groups have no interconnection. Of the crossbar switches at the first stage connected to the two output ports (A output port and B output port) of each node, 2 (m−1) output ports of the crossbar switches connected to the A output ports of respective nodes are connected in one-to-one correspondence to input ports of different crossbar switches at the second stage of the E group. Similarly, 2 (m−1) output ports of the crossbar switches connected to the B output ports of respective nodes are connected in one-to-one correspondence to input ports of different crossbar switches at the second stage of the F group. Of the crossbar switches at the final stage connected to the two input ports (C input port and D input port) of each node, 2 (m−1) input ports of different crossbar switches connected to the C input ports of respective nodes are connected in one-to-one correspondence to output ports of 2 (n−m−1) crossbar switches at the <n/m>-th stage of the E group. Similarly, 2 (m−1) input ports of different crossbar switches connected to the D input ports of respective nodes are connected in one-to-one correspondence to output ports of 2 (n−m−1) crossbar switches at the <n/m>-th stage of the F group. Further, in the interconnection of the multistage interconnection network from the output ports of the crossbar switches at the second stage to the input ports of the crossbar switches at the <n/m>-th stage, the output ports of 2 (n−m−1) crossbar switches at each stage of the E group are connected in one-to-one correspondence to the input ports of 2** (n−m−1) different crossbar switches at the next stage of the E group. Similar interconnection is also performed for the crossbar switches of the F group.

In point-to-point communication between optional nodes of the multistage interconnection network constructed as above, two communication routes are selectable at each node having two output ports, and 2 (m−1) communication routes which are a half of the number of output ports 2m are selectable at each crossbar switch at the first stage. Therefore, 2×2 (m−1)=2m communication routes in total are selectable. With the parallel computer using this multistage interconnection network, even if a failure occurs in the multistage interconnection network not only between the first stage and the final stage but also between the output ports of nodes and the first stage and between the final stage and the input ports of nodes, these failed sites can be avoided and communication can be established.

Accordingly, with the parallel computer using this multistage interconnection network, a number of communication routes between processor nodes can be provided and the reliability is improved. Therefore, this parallel computer is suitable for commercial use which requires high reliability, for example, for financial use.

In the structure of the multistage interconnection network, the number of stages is <n/m>+1. Even in a multistage interconnection network having <n/m> stages, the first stage and the <n/m>-th stage may be duplicated in the above manner, a half of the output ports of crossbar switches at the first stage may be directly connected to the input ports of crossbar switch at the <n/m>-th stage, and the remaining output ports and input ports may be connected in the above manner. With this arrangement, communication paths can be partially made multiple and the reliability can be improved.

The relationship between a communication packet, a node number, and selection of an output port of a crossbar switch can be generalized as in the following.

For point-to-point communication between optional nodes, 2n nodes are assigned node serial numbers from "0" to "2n−1". A transfer packet has output port selection fields (routing fields, corresponding to fields 510, 520, and 530 in FIG. 4) at the head of the data field (corresponding to the data field 550 in FIG. 4). The output port selection field stores information (routing data) for selecting an output port of a crossbar switch at each stage, the routing data corresponding in number to <n/m>+1 equal to the number of stages of the multistage interconnection network. A first output port selection field is an m-bit field storing an output port number which a crossbar switch at the first stage selects. An i-th (i: positive integer, 1<i≦<n/m>+1) output port selection field stores a decoded value of m bits at [<n/m>+ 2−i]-th counted from the lowest bit, among a plurality of m-bit blocks constituted by a binary value (n bits) of the node number of a transfer destined node. The transfer originating node sends a packet from its output port to the multistage interconnection network, the packet having predetermined values set to the output port selection fields. The crossbar switch at the first stage of the multistage interconnection network refers to the first output port selection field of the received packet, selects the received packet output port in accordance with the value stored in the first output port selection field, and outputs the packet to the next crossbar switch connected to the output port. The crossbar switch at the i-th stage refers to the i-th output port selection field of the received packet, selects the received packet output port in accordance with the value stored in the i-th output port selection field, and outputs the packet to the next crossbar switch or node connected to the output port. In this manner, the data packet can be transferred from the transfer originating node to the transfer destined node, while determining a communication route.

More specifically, for communication between the nodes connected to the same crossbar switch, the most significant bit of m bits of the first output port selection field is set with "1" indicating the same crossbar switch. For communication between the nodes connected to different crossbar switches, the most significant bit of the m bits is set with "0", indicating different crossbar switches. The crossbar switch at the first stage of the multistage interconnection network refers to the first output port selection field of the received packet. If the most significant bit of the m bits is "1", the crossbar switch selects the output port directly connected to the crossbar switch at the (<n/m>+1)-th stage, whereas if the most significant bit of the m bits is "0", the crossbar switch selects the output port connected to the crossbar switch at the next stage. With this multistage interconnection network, the crossbar switch at the first stage directly transmits the packet to the crossbar switch at the (<n/m>+1)-th stage if the transfer destined node is connected to the crossbar switch at the (<n/m>+1)-th stage directly connected to its own crossbar switch. Therefore, in transferring a data packet from the transfer originating node to the transfer destined node, a delay by the packet switching at the intermediate stage can be eliminated.

Generalization of the structure of the multistage interconnection network and the routing method has been given in the above.

The invention can be described from the different viewpoint as in the following.

A network applicable to this invention is constituted by multiple switches interconnecting N (N: positive integer) nodes, has one output route from the transfer originating node to the first stage switch connected to the transfer originating node, and has one input route from the final stage switch connected to the transfer destined node to the transfer destined node. Further, the network has one relay route from the first stage switch connected to the transfer originating node to the final stage switch connected to the transfer destined node.

Application of this invention to this network will be described below.

At least one stage is added to the network of a multistage structure which has only one relay route from the first stage switch connected to the transfer originating node to the final stage switch connected to the transfer destined node. This added stage provides a plurality of relay routes from the first stage switch to the final stage switch.

Next, the output port at the transfer originating node and the input port at the transfer destined node are duplicated. The first stage switch and final stage switch are also duplicated. The duplicated output ports of the transfer originating node are connected in one-to-one correspondence to the duplicated first stage switches, and the duplicated input ports of the transfer destined node are connected in one-to-one correspondence to the duplicated last stage switches. In this manner, the route from the transfer originating node to the first stage switch and the route from the final stage switch to the transfer destined node are both duplicated. Furthermore, a plurality of relay routes are divided and each divided route group is allocated to the duplicated first stage switches and the duplicated final stage switches.

In this network, the output route from the output port of the transfer originating node to the first stage switch is duplicated, and the final stage switch and the input route from the final stage switch to the input port of the transfer destined node are duplicated. Reliability can therefore be improved.

As compared to a multistage interconnection network in which two networks are merely provided for duplication, each having only one relay route from the first stage switch connected to the transfer originating node to the final stage switch connected to the transfer destined node, although the network of this invention uses an additional stage, the intermediate switches except the first and final stages are not necessary to be duplicated. Since the number of switches at the intermediate stages is not increased, the route from the transfer originating node to the transfer destined node can be duplicated efficiently.

The structure of the multistage interconnection network of this invention has been described above.

Next, comparison between the structure of the multistage interconnection network of this invention and that of a conventional multistage interconnection network will be made.

First, the numbers of switch elements are compared between the mutual interconnection system of the multistage interconnection network of this invention and a conventional, typical duplicated mutual interconnection system (the number of switch elements is defined such that it is p if a switch has p inputs and p outputs. For example, the number of switch elements shown in FIG. 3 is 4). Mutual interconnection systems to be compared include a lattice interconnection, a perfect crossbar switch interconnection (in addition to lattice interconnection, a direct interconnection route is provided between nodes to be relayed), a torus interconnection, and a mutual interconnection described in JP-A-63-124162 cited earlier as conventional technique. The numbers of switch elements on all communication routes were compared between the multistage interconnection network of this invention and duplicated systems using merely two comparison networks described above. For the simplicity purpose, it is assumed that $B^{**}2$ nodes disposed in B×B are interconnected by each interconnection network.

The numbers of switch elements are as follows.

Lattice interconnection: $2\times(5B^{**}2-4B)$

Perfect crossbar interconnection: $2\times B^{**}4$

Torus interconnection: 2×5B**2
Mutual interconnection of
   JP-A-63-124162: 2×5B**2
Present invention: 5B**2

B**n indicates B raised to a power n. For example, if B is 64, the numbers of switch elements are as follows.

Lattice interconnection: 40448
   Perfect crossbar interconnection: 33554432
   Torus interconnection: 40960
   Mutual interconnection of JP-A-63-124162: 40960
   Present invention: 20480

In a multistage interconnection network for a parallel computer, reliability of communication between the network and nodes is improved and therefore reliability of communication between nodes is improved by duplicating the output and input ports of each node, by connecting two output ports to different network constituents, and by connecting two input ports to different network constituents. The interconnection system of this invention can achieve the above reliability with less hardware as compared to other interconnection systems. In order to improve the reliability of communication networks, the other interconnection systems can utilize only simple duplication because of the structure of networks, and therefore as many switch elements as described above become necessary.

Next, the multistage interconnection network of this invention is compared with a network formed by two multistage interconnection networks having a minimum necessary number of stages required for interconnection between nodes. The numbers of switch elements of networks having 2n nodes and 2m input-output ports (number of switch elements) of a crossbar switch are as follows.

(A) the minimum necessary number of switch elements of a multistage interconnection network formed by two multistage interconnection networks having a minimum necessary number of stages, is:

(stage number) × (crossbar switch number/stage) ×

(switch number/crossbar switch) =

$(n/m) \times 2^{} (n-m) \times 2^{} m$

Therefore, the minimum necessary number of switches of the multistage interconnection network formed by two networks is given by:

$$2 \times (n/m) \times 2^{} (n-m) \times 2^{} m \quad (8)$$

Since the network is formed by two multistage interconnection networks of minimum requisites, the number of routes for point-to-point communication is:

$$\text{``2''} \quad (9)$$

(B) The number of switches of the multistage interconnection network of this invention is:

[(crossbar switch number at intermediate stages) +  (10)

(crossbar switch number at first and final stages)] ×

(switch number/crossbar switch) =

{(stage number at intermediate stages) ×

(crossbar switch number/stage) +

[(stage number at first stage] + stage number at last stage) × (crossbar switch number/ stage)} × (switch number/crossbar switch) =

$[(n/m - 1) \times 2^{} (n - m) + 2 \times 2^{} (n - m + 1)] \times 2^{**} m$ The number of routes for point-to-point communication is:

$$\text{``}2^{**}m\text{''} \quad (11)$$

The condition that a value of the formula (8) divided by the formula (10) is larger than 1, is n>3m (if n=3m, the numbers of switches are the same). Since the value of the formula (11) divided by the formula (9) is 2 (m−1) and m is 1 or larger, the value 2 (m−1) is always 1 or larger so that the number of routes of this invention is always larger. If the condition n>m is satisfied, the invention can provide a plurality of routes with a smaller number of switches than the network formed by two multistage interconnection networks of minimum requisites, and can provide an economical multistage interconnection network.

In a parallel computer, the number of switch elements of a crossbar switch increases less than the number of nodes. Therefore, the condition n>3m can be satisfied by future parallel computers. If the number of switch elements of a crossbar switch of a general parallel computer is taken into consideration, m is 2 or larger and the number of routes is larger than 2 so that the reliability is improved more than a network formed by two multistage interconnection networks of minimum requisites.

For example, if m=3 and n=3m=9 (i.e., the number of nodes is 512), although the numbers of switches are the same for both the network of this invention and a network formed by two multistage interconnection networks of minimum requisites, the number of routes is two for the network formed by two multistage interconnection network of minimum requisites and the number of routes of this invention is 2m=8. The reliability can therefore be improved considerably. From a different viewpoint, consider a parallel computer wherein each of a plurality of crossbar switches has 2m switch elements and the network constituted by the crossbar switches has 2nodes interconnected by the switches. In this case, the network of this invention has the number of routes between nodes multiplied by 2 (m−1) if the number of switches same as a network formed by two multistage interconnection networks of minimum requisites is used.

According to the present invention, in a multistage interconnection network for a parallel computer, the output port of a transfer originating node, the route from the output port of the first stage crossbar switch, and the first stage crossbar switch, are made duplicate, and the final stage crossbar switch, the route from the final stage crossbar switch to the transfer destined node, and the input port of the transfer destined node, are also made duplicate. Further, a plurality of routes are provided from the first stage crossbar switch to the final stage crossbar switch. Accordingly, a plurality of communication routes can be provided from the transfer originating node to the transfer destined node. A highly reliable multistage interconnection network can therefore be achieved which can continue communication by using another communication route even if one communication route fails. The plurality of routes between the first stage switch to the final stage switch are not necessarily required to be formed by two networks of the same structure. Therefore, intermediate stages between the first stage to the final stage can be configured relatively freely.

What is claimed is:

1. A parallel computer comprising:

a multistage interconnection network for interconnecting N (N: positive integer) processor nodes each having two input ports and two output ports, wherein said multistage interconnection network interconnects a plurality of stages each having a plurality of switches;

each switch has M (M: positive integer) input ports and M output ports;

said plurality of stages include a first stage each switch of which has an input port connected to the output port of each processor node and a final stage each switch of which has an output port connected to the input port of each processor node;

said first and final stages each have 2×<N/M> switches (where <N/M> is a minimum integer equal to or larger than N/M); and the two output ports of each processor node are connected to the input ports of different switches at said first stage, and the two input ports of the processor node are connected to the output ports of different switches at said final stage.

2. A parallel computer according to claim 1, wherein said plurality of stages include at least one intermediate stage for interconnecting said first and final stages;

said intermediate stage has <N/M> switches; and the input ports of each switch of said intermediate stage are connected to the output ports of different switches at said first stage, and the output ports of each switch of said intermediate stage are connected to the input ports of different switches at said final stage.

3. A parallel computer according to claim 2, wherein at least one output port of each switch at said first stage is directly connected to at least one input port of an optional switch at said final stage.

4. A parallel computer according to claim 1, wherein the switches at said first stage are divided into A and B groups each having <N/M> switches;

the switches at said final stage are divided into C and D groups each having <N/M> switches;

one of the two output ports of each processor node is connected to the input port of a switch belonging to said A group at said first stage, and the other of the two output ports of each processor node is connected to the input port of a switch belonging to said B group; and one of the two input ports of each processor node is connected to the output port of a switch belonging to said C group at said final stage, and the other of the two input ports of each processor node is connected to the output port of a switch belonging to said D group.

5. A multistage interconnection network for interconnecting a plurality of nodes each having two input ports and two output ports, wherein:

said multistage interconnection network interconnects a plurality of interconnected stages each having a plurality of switches;

said plurality of stages include a first stage each switch of which has an input port connected to the output port of each node, a final stage each switch of which has an output port connected to the input port of each node, and at least one intermediate stage for interconnecting said first and final stages;

said first and final stages have switches two times as large as the number of switches at said intermediate stage;

the two output ports of each node are connected to the input ports of different switches at said first stage, and the two input ports are connected to the output ports of different switches at said final stage; and the input ports of each switch of said intermediate stage are connected to the output ports of different switches at said first stage, and the output ports of each switch of said intermediate stage are connected to the input ports of different switches at said final stage.

6. A multistage interconnection network according to claim 5, wherein:

at least one output port of each switch at said first stage is directly connected to at least one input port of an optional switch at said final stage.

7. A multistage interconnection network according to claim 5, wherein:

said multistage interconnection network interconnects $2^{}m$ (m: positive integer, $$: indicating a power) nodes;

each switch has $2^{}m$ (m: positive integer) input ports and $2^{}m$ output ports;

said plurality of stages include at least (<n/m>+1) stages;

said first and final stages each have $2^{**}$ (n−m+1) switches;

each stage of said intermediate stages from the second stage to the (<n/m>)-th stage has $2^{**}$ (n−m) switches;

the input ports of each switch at said second stage are connected to the output ports of different switches at said first stage;

the output ports of each switch at said (<n/m>)-th switch are connected to the input ports of different switches at said final stage; and from said second stage to said (<n/m>)-th stage, the output ports of each switch at each stage are connected to the input ports of switches at the next stage.

8. A multistage interconnection network according to claim 7, wherein:

at least one output port of each switch at said first stage is directly connected to at least one input port of an optional switch at said final stage.

9. A multistage interconnection network according to claim 8, wherein:

the switches at said first stage are divided into A and B groups each having $2^{**}$ (n−m) switches;

the switches at said final stage are divided into C and D groups each having $2^{**}$ (n−m) switches;

one of the two output ports of each node is connected to the input port of a switch belonging to said A group at said first stage, and the other is connected to the input port of a switch belonging to said B group; and one of the two input ports of each node is connected to the output port of a switch belonging to said C group at said final stage, and the other is connected to the output port of a switch belonging to said D group.

10. A multistage interconnection network according to claim 9, wherein:

the switches at each stage from the second stage to the (<n/m>)-th stage are divided into E and F groups each having $2^{**}$ (n−m−1) switches;

the input ports of each switch belonging to said E group at said second stage are connected to the output ports of switches belonging to said A group at said first stage, and the input ports of each switch belonging to said F group at said second stage are connected to the output ports of switches belonging to said B group at said first stage;

the output ports of each switch belonging to said E group at said (<n/m>)-th stage are connected to the input ports of switches belonging to said C group at said final stage, and the output ports of each switch belonging to said F group at said (<n/m>)-th stage are connected to the input ports of switches belonging to said D group at said final stage;

from said second stage to said (<n/m>)-th stage, the output ports of each switch belonging to each group at each stage are connected to the input ports of switches belonging to the same group at the next stage.

11. A multistage interconnection network according to claim 6, wherein:

each node transfers a packet via said multistage interconnection network to another node, each packet is provided at each stage and has a plurality of routing fields for storing information representative of an output port from which a packet received at each switch at each stage is output, and a data field for storing transfer data; and a switch at said first stage received a packet from each node refers to the information in the routing field corresponding to said first stage and stored in the packet to select an output port, and transfers the packet to a switch at the next stage connected to the output port, and a switch at each stage received a packet from the preceding stage refers to the information in the routing field corresponding to said stage and stored in the packet to select an output port, and transfers the packet to a switch or node at the next stage connected to the output port.

12. A multistage interconnection network according to claim 11, wherein:

a switch at said first stage received a packet selects an output port connected to said final stage, if the information in the routing field corresponding to said first stage and stored in the packet indicates specific information, and transfers the packet to a switch at said final stage.

13. A parallel computer having a multistage interconnection network for interconnecting a plurality of processor nodes each having two input ports and two output ports, wherein:

said multistage interconnection network interconnects a plurality of interconnected stages each having a plurality of switches;

said plurality of stages include a first stage each switch of which has an input port connected to the output port of each node, a final stage each switch of which has an output port connected to the input port of each node, and at least one intermediate stage for interconnecting said first and final stages;

said first and final stages have switches two times as large as the number of switches at said intermediate stage;

the two output ports of each processor node are connected to the input ports of different switches at said first stage, and the two input ports are connected to the output ports of different switches at said final stage; and the input ports of each switch of said intermediate stage are connected to the output ports of different switches at said first stage, and the output ports of each switch of said intermediate stage are connected to the input ports of different switches at said final stage.

14. A parallel computer according to claim 13, wherein:

at least one output port of each switch at said first stage is directly connected to at least one input port of an optional switch at said final stage.

15. A parallel computer according to claim 13, wherein:

said multistage interconnection network interconnects N (N: positive integer) processor nodes;

each switch has M (M: positive integer) input ports and M output ports;

said first and final stages each have 2×<N/M> switches (where <N/M> is a minimum positive integer equal to or large than N/M); and said intermediate stage has <N/M> switches.

16. A parallel computer according to claim 13, wherein said multistage interconnection network interconnects $2^{}m$ (m: positive integer, : indicating a power) processor nodes;

each switch has $2^{}m$ (m: positive integer) input ports and $2^{}m$ output ports;

said plurality of stages include at least (<n/m>+1) stages;

said first and final stages each have $2^{**}$ (n−m\+1) switches;

each stage of said intermediate stages from the second stage to the (<n/m>)-th stage has $2^{**}$ (n−m) switches;

the input ports of each switch at said second stage are connected to the output ports of different switches at said first stage;

the output ports of each switch at said (<n/m>)-th switch are connected to the input ports of different switches at said final stage; and from said second stage to said (<n/m>)-th stage, the output ports of each switch at each stage are connected to the input ports of switches at the next stage.

17. A parallel computer according to claim 16, wherein:

at least one output port of each switch at said first stage is directly connected to at least one input port of an optional switch at said final stage.

18. A parallel computer according to claim 17, wherein:

the switches at said first stage are divided into A and B groups each having $2^{**}$ (n−m) switches;

the switches at said final stage are divided into C and D groups each having $2^{**}$ (n−m) switches;

one of the two output ports of each processor node is connected to the input port of a switch belonging to said A group at said first stage, and the other is connected to the input port of a switch belonging to said B group; and one of the two input ports of each processor node is connected to the output port of a switch belonging to said C group at said final stage, and the other is connected to the output port of a switch belonging to said D group.

19. A parallel computer according to claim 14, wherein:

each processor node transfers a packet via said multistage interconnection network to another processor node, each packet is provided at each stage and has a plurality of routing fields for storing information representative of an output port from which a packet received at each switch at each stage is output, and a data field for storing transfer data; and a switch at said first stage received a packet from each processor node refers to the information in the routing field corresponding to said first stage and stored in the packet to select an output port, and transfers the packet to a switch at the next stage connected to the output port, and a switch at each stage received a packet from the preceding stage refers to the information in the routing field corresponding to said stage and stored in the packet to select an output port, and transfers the packet to a switch or processor node at the next stage connected to the output port.

20. A parallel computer according to claim 19, wherein:

a switch at said first stage received a packet selects an output port connected to said final stage, if the information in the routing field corresponding to said first stage and stored in the packet indicates specific information, and transfers the packet to a switch at said final stage.

* * * * *